(12) United States Patent
Kouno et al.

(10) Patent No.: US 7,313,954 B2
(45) Date of Patent: Jan. 1, 2008

(54) APPARATUS FOR MEASURING FLOW CHARACTERISTICS

(75) Inventors: Yasushi Kouno, Obu (JP); Teruaki Kaifu, Anjo (JP); Junzo Yamaguchi, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/441,097

(22) Filed: May 26, 2006

(65) Prior Publication Data

US 2006/0266110 A1 Nov. 30, 2006

(30) Foreign Application Priority Data

May 30, 2005 (JP) ............................... 2005-157136

(51) Int. Cl.
*G01F 1/68* (2006.01)
*G01F 5/00* (2006.01)

(52) U.S. Cl. ........................ 73/202.5; 73/202

(58) Field of Classification Search ................ 73/202.5
See application file for complete search history.

(56) References Cited

U.S. PATENT DOCUMENTS

| | | | | |
|---|---|---|---|---|
| 3,374,673 A | * | 3/1968 | Trageser | ................... 73/204.21 |
| 3,890,838 A | * | 6/1975 | Paetzold | ................... 73/861.34 |
| 4,317,365 A | * | 3/1982 | Lauterbach | ............... 73/204.21 |
| 4,433,576 A | * | 2/1984 | Shih et al. | ................. 73/204.21 |
| 4,449,401 A | * | 5/1984 | Kaiser et al. | ............... 73/202.5 |
| 4,457,169 A | * | 7/1984 | Lauterbach et al. | ...... 73/204.21 |
| 4,709,581 A | | 12/1987 | Nishimura et al. | |
| 4,776,213 A | * | 10/1988 | Blechinger et al. | ............ 73/202 |
| 4,920,808 A | * | 5/1990 | Sommer | ................... 73/861.42 |
| 5,209,113 A | * | 5/1993 | Sawada et al. | ............. 73/202.5 |
| 5,476,012 A | * | 12/1995 | Takashima | ................ 73/861.34 |
| 5,485,746 A | | 1/1996 | Mori et al. | |
| 5,544,527 A | * | 8/1996 | Kitahara et al. | .......... 73/204.21 |
| 5,571,964 A | | 11/1996 | Sawada et al. | |
| 5,581,026 A | | 12/1996 | Sawada et al. | |
| 6,085,587 A | * | 7/2000 | Konzelmann | ................. 73/202 |
| 6,267,006 B1 | * | 7/2001 | Bugli et al. | ................. 73/118.2 |
| 6,279,393 B1 | * | 8/2001 | McLaughlin | .............. 73/170.14 |
| 6,684,692 B1 | * | 2/2004 | Lenzing et al. | ............. 73/202.5 |
| 6,705,159 B2 | * | 3/2004 | Lenzing | ..................... 73/202.5 |
| 6,938,473 B2 | | 9/2005 | Iwaki et al. | |
| 6,973,823 B2 | | 12/2005 | Lenzing et al. | |

FOREIGN PATENT DOCUMENTS

JP 06018303 A * 1/1994

* cited by examiner

*Primary Examiner*—Edward Lefkowitz
*Assistant Examiner*—Jonathan Dunlap
(74) *Attorney, Agent, or Firm*—Nixon & Vanderhye PC

(57) ABSTRACT

A flow detection device for detecting a flow characteristic of a fluid within a pipe is disclosed. The flow detection device includes a first channel portion that defines a first channel with an upstream aperture. The fluid can flow into the first channel through the upstream aperture. The device also includes a flow sensor disposed in the first channel, and the flow sensor detects the flow characteristic of the fluid. Furthermore, the device includes a flow straightening member that is provided upstream of the first channel. The upstream aperture is hidden by the flow straightening member as viewed looking downstream along an axis of the first channel portion. Also, the fluid flows from substantially the entire circumference of the flow straightening member into the first channel.

16 Claims, 8 Drawing Sheets

AIR FLOW →

AIR FLOW →

APPARATUS FOR MEASURING FLOW CHARACTERISTICS

CROSS REFERENCE TO RELATED APPLICATION

This application is based upon and claims the benefit of priority of Japanese Patent Application No. 2005-157136 filed on May 30, 2005, the content of which is incorporated herein by reference.

FIELD OF THE INVENTION

The present invention relates to an apparatus for measuring flow characteristics such as the amount of air flowing through an intake port connected to the combustion chamber of an internal combustion engine.

BACKGROUND OF THE INVENTION

Several devices have been provided for measuring flow characteristics of a fluid. For instance, thermal apparatuses for measuring flow amounts have been designed. In these devices, a flow sensor generates heat, and the amount of heat radiated from the flow sensor to fluid is detected to thereby measure the flow amount. (See, e.g., U.S. Pat. No. 6,973,823 (claiming priority to Japanese Patent Publication No. 2004-53600), U.S. Pat. No. 6,938,473 (claiming priority to Japanese Patent Publication No. 2003-214915), U.S. Pat. No. 5,485,746 (claiming priority to Japanese Patent 3240782), U.S. Pat. No. 4,709,581, and U.S. Pat. Nos. 5,571,964 and 5,581,026 (claiming priority to Japanese Patent Publication No. Hei 5(1993)-164585). However, these and other related prior art devices have certain disadvantages.

For instance, in the device of U.S. Pat. No. 6,973,823, the axis of the measurement passage is curved. As such, the flow of the fluid may become uneven, making measurement inaccurate.

The apparatus described in U.S. Pat. No. 6,938,473 includes an obstruction member formed in a columnar shape, and air within a narrow area of the pipe flows into a sensor channel. As such, the flow velocity within the sensor channel is less likely to correlate with the flow velocity in the main portion of the intake port. For this reason, the flow measurements may be inaccurate.

Furthermore, the apparatus described in U.S. Pat. No. 5,485,746 has an inlet portion open toward the upstream side. As such, dust may flow in and stick to the flow sensor, and this makes measurement results unstable.

Moreover, the air flow meter illustrated in FIG. 26 of U.S. Pat. No. 4,709,581 includes a deflector that is smaller than the inlet opening. This allows dust to flow into a bypass channel, and this makes measurement results unstable.

Also, the devices described in U.S. Pat. No. 5,571,964 and U.S. Pat. No. 5,581,026 each include an inlet portion open toward the upstream side. As such, dust may flow in and measurement results may be unreliable.

In addition, flow sensing devices with thermal sensors (e.g., hot wire type mass air flow sensors) can be inaccurate. For instance, these devices often include one or more support members to which the thermal sensor is coupled. However, heat may be lost to the support member instead of the fluid. This may be especially true when the flow velocity of the fluid is relatively low (e.g., when an engine is idling). As such, the ratio of heat radiated to the fluid is reduced, and the ratio of heat loss is relatively increased. This significantly degrades the detection accuracy.

The devices in U.S. Pat. Nos., 5,485,746, 4,709,581, 5,571,964 and 5,581,026 include a central member (i.e., a first channel portion) and a main passage. The central member is enlarged to obstruct size of the main passage. The flow velocity of fluid flowing through the main passage is thereby increased. Also, the outlet portion of a bypass passage (i.e., a first channel) is obstructed by a downstream member or the downstream portion of the central member. Thus, the flow velocity of fluid flowing through the bypass passage is increased by the negative pressure produced by fluid flowing through the main passage. When the flow velocity is increased, the ratio of heat escaping to air is enhanced; therefore, the detection accuracy can be enhanced. However, the main passages respectively form part of an intake port. Thus, to obstruct the main passage, the central member is enlarged so that the outer wall surface of the central member is adjacent the inner wall surface of the intake port. That is, to enhance the detection accuracy of these devices, the central members are enlarged.

SUMMARY OF THE INVENTION

Accordingly, a flow detection device for detecting a flow characteristic of a fluid within a pipe is disclosed. The flow detection device includes a first channel portion that defines a first channel with an upstream aperture. The fluid can flow into the first channel through the upstream aperture. The device also includes a flow sensor disposed in the first channel, and the flow sensor detects the flow characteristic of the fluid. Furthermore, the device includes a flow straightening member that is provided upstream of the first channel. The upstream aperture is hidden by the flow straightening member as viewed looking downstream along an axis of the first channel portion. Also, the fluid flows from substantially the entire circumference of the flow straightening member into the first channel.

Also, another flow detection device for detecting a flow characteristic of a fluid within a pipe is disclosed. The flow detection device includes a first channel portion that defines a first channel through which the fluid can flow. The first channel has an upstream aperture and a downstream aperture such that the fluid can enter the first channel through the upstream aperture and exit the first channel through the downstream aperture. The device also includes a flow sensor disposed in the first channel, and the flow sensor can detect the flow characteristic of the fluid. Furthermore, the device includes a second channel portion that defines a second channel. The first channel portion is coupled to the second channel portion and is disposed within the second channel. Additionally, a downstream member is disposed downstream of the downstream aperture so as to obstruct flow out of the downstream aperture.

DETAILED DESCRIPTION OF THE PREFERRED EMBODIMENTS

Hereafter, description will be given to multiple embodiments of the invention with reference to drawings.

First Embodiment

Figure 1A:
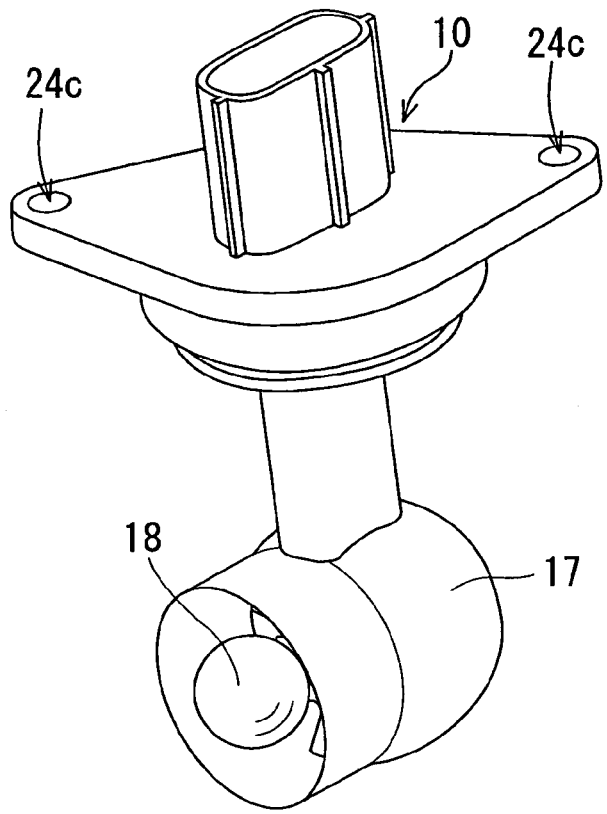
FIG. 1A is a perspective view of one embodiment of a flow detection device.
Figure 1B:
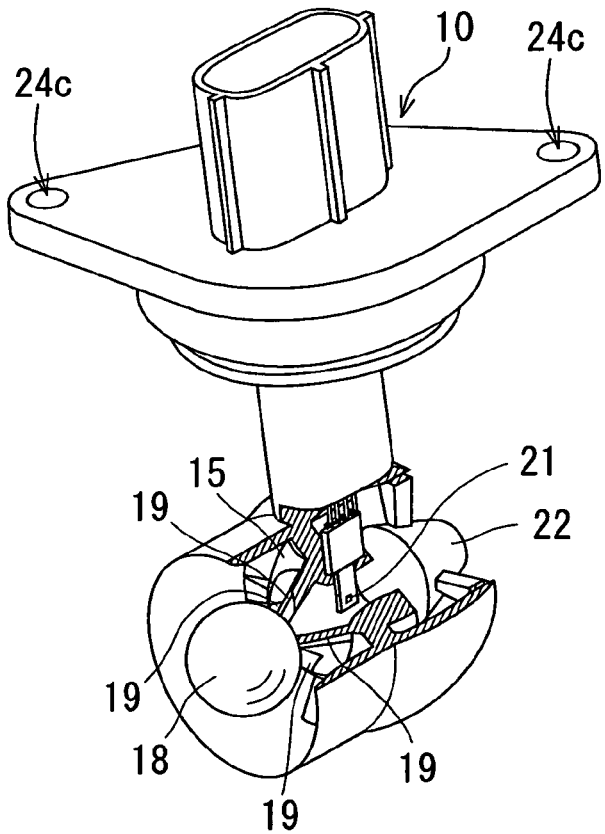
FIG. 1B is a partially sectioned perspective view of the flow detection device of FIG. 1A.
Figure 2:
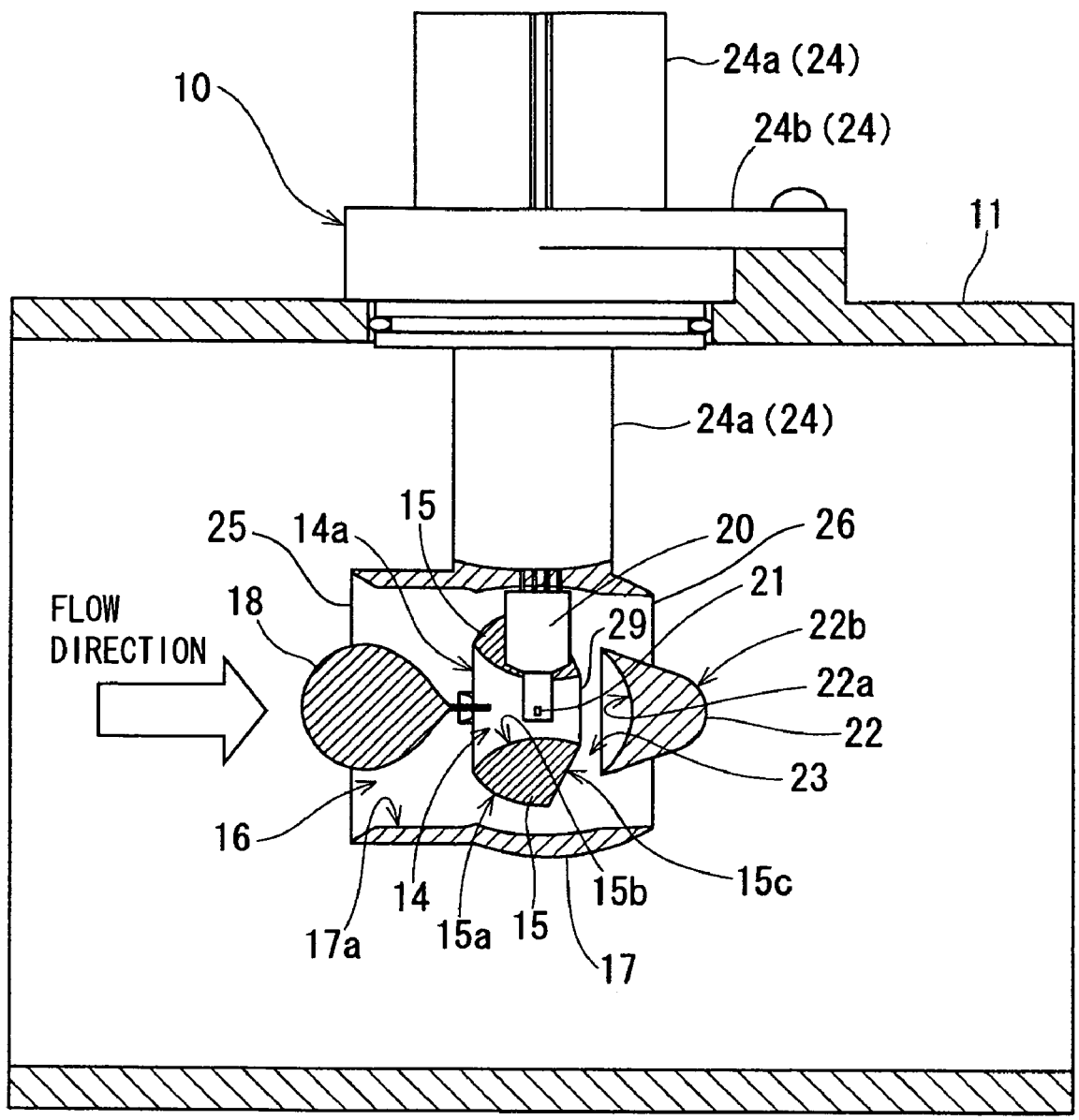
FIG. 2 is a sectional view of the flow detection device of FIG. 1A mounted within a flow channel and taken along the direction of flow.

Initially referring to FIGS. 1A-3B, one embodiment of a flow detection device 10 is illustrated. As shown in FIG. 2, the flow detection device 10 can be disposed within a pipe 11, such as an air intake port of an engine. In one embodiment, an air cleaner (i.e., filter) is included upstream of the flow detection device 10. Downstream of the detection device 10 is a combustion chamber of an internal combustion engine.

As shown, the flow detection device 10 includes a first channel portion 15 that defines a first channel 14 extending therethrough. The first channel 14 includes an upstream aperture 14a and a downstream aperture 29. The flow detection device 10 also includes a second channel portion 17 that defines a second channel 16 extending therethrough. The second channel 16 includes an upstream aperture 25 and a downstream aperture 26. The device 10 further includes a flow straightening member 18 and a downstream member 22, each of which will be described. Furthermore, the device 10 includes a sensor portion 20 and a support portion 24.

The sensor portion 20 includes a flow sensor 21 that is disposed in the first channel 14. As will be described below, as fluid flows through the pipe 11, the flow sensor 21 detects at least one flow characteristic (e.g., flow amount, mass flow rate, flow velocity, etc.) of the fluid. It will be appreciated that the flow detection device 10 can be used for detecting any suitable flow characteristic for any suitable fluid.

Figure 3A:
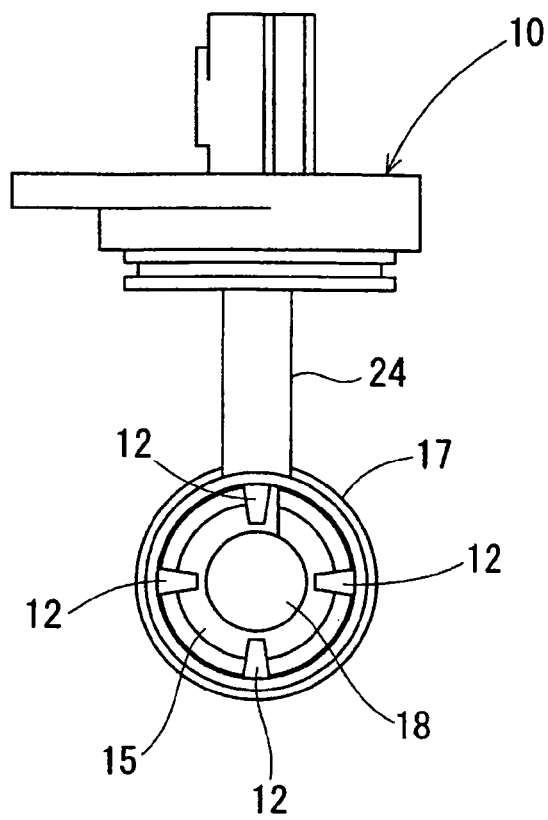
FIG. 3A is a side view of the flow detection device of FIG. 1A shown in the direction of fluid flow.
Figure 3B:
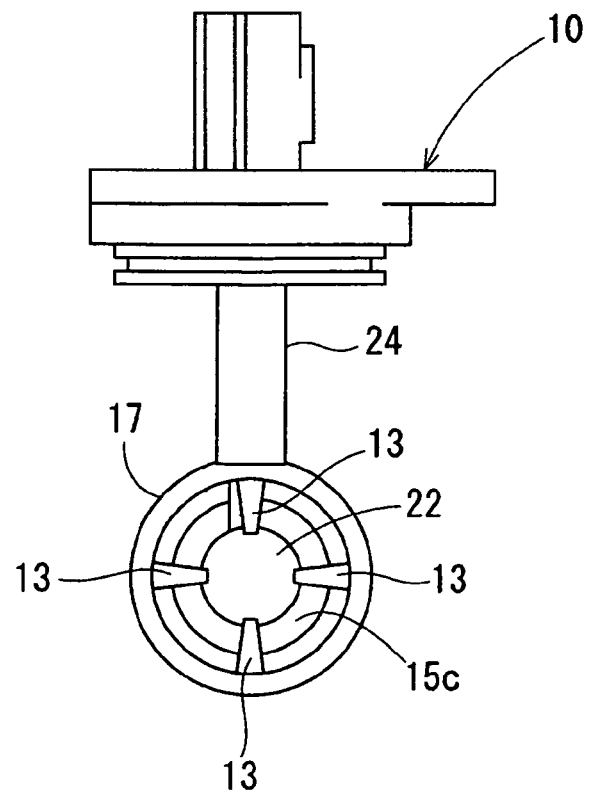
FIG. 3B is a side view of the flow detection device of FIG. 1A shown opposite the direction of fluid flow.

In the embodiment shown, the second channel portion 17 has a substantially cylindrical shape. The first channel portion 15 is coupled to the second channel portion 17 and is supported in the second channel 16 by a plurality of arm portions 12 (FIG. 3A). The arm portions 12 extend from the inner wall of the second channel portion 17.

The axis of the first channel 14 is substantially straight and is disposed approximately parallel to the direction of fluid flow. In the embodiment shown in FIG. 2, the first channel portion 15 includes an inner surface 15b, which defines the first channel 14. The inner surface 15b is shaped such that sections of the first channel 14 taken along the direction of flow are approximately bobbin-shaped. In other words, an upstream end of the first channel 14 has a width perpendicular to the flow direction; moving downstream from the upstream end, the width of the first channel 14 gradually decreases; then, moving further downstream, the width of the first channel 14 gradually increases. Also, in the embodiment shown, the first channel 14 is widest at the upstream end. As such, the flow velocity in proximity to the downstream end of the first channel 14 is stabilized over the circumference thereof.

The first channel portion 15 also includes a first outer surface 15a and an end face 15c, which is disposed downstream of the first outer surface 15a. The width of the first outer surface 15a gradually increases moving from an upstream end toward a downstream end. Also, the first outer surface 15a and the inner surface 15b intersect at an acute angle on the upstream side of the first channel portion 15. As such, the fluid flowing into the second channel 16 is smoothly separated to flow either into the first channel 14 or to continue through the second channel 16.

The end face 15c is frustoconical in shape. The width of the end face 15c decreases as observed moving downstream, such that the width of the end face 15c is smallest at the downstream end.

In the embodiment illustrated, the axis of the first channel 14 and the axis of the second channel 16 are substantially straight, and these axes are substantially parallel to the axis of the pipe 11. As such, the direction of the fluid flowing through the pipe 11 changes insignificantly when flowing through the flow detection device 10. For this reason, flow velocity losses of the fluid are reduced.

The flow straightening member 18 is disposed upstream from the first channel 14. In the embodiment shown, the device 10 includes a plurality of arm portions 19 that each extend upstream from the first channel portion 15 and are coupled to the flow straightening member 18 (FIG. 1B). As such, the flow straightening member 18 is coupled to the first channel portion 15. Thus, the position of the flow straightening member 18 relative to the first channel portion 15 can be accurately controlled, thereby enhancing the accuracy of the flow measurements.

In the embodiment shown, the flow straightening member 18 projects at least partially from the upstream aperture 25 of the second channel portion 17. In another embodiment, the entire flow straightening member 18 is disposed within the second channel portion 17.

Figure 4A:
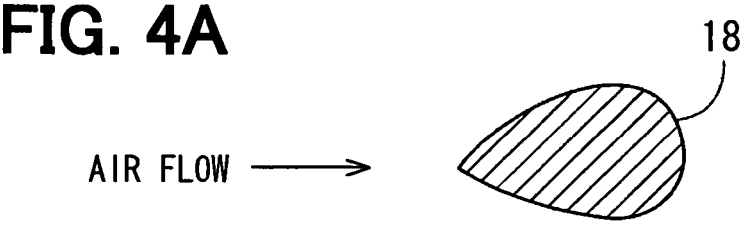
FIG. 4A is a sectional view of one embodiment of a flow straightening member.
Figure 4B:
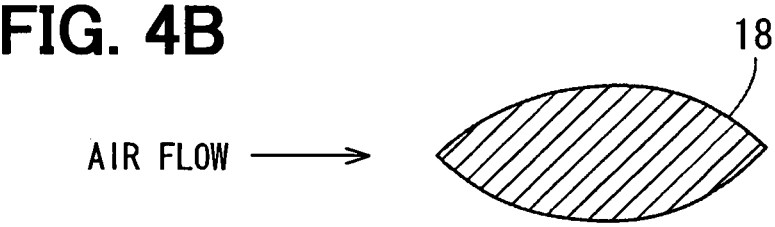
FIG. 4B is a sectional view of another embodiment of a flow straightening member.

It will be appreciated that the flow straightening member 18 can be of any suitable shape. For instance, in the embodiment shown, the flow straightening member 18 includes an upstream side that is substantially hemispherical. Also, the flow straightening member 18 includes a downstream side that is conic in shape such that the width of the flow straightening member 18 decreases as observed moving downstream. In another embodiment shown in FIG. 4A, the flow straightening member 18 is streamlined so as to include an upstream side that has a gradually increasing width as observed moving downstream, and the flow straightening member 18 also includes a downstream side that is hemispherical in shape. In still another embodiment shown in FIG. 4B, the flow straightening member 18 is streamlined so as to include an upstream side that has a gradually increasing width as observed moving downstream and a downstream side that has a gradually decreasing width as observed moving downstream.

As illustrated in FIG. 3A, the size of the flow straightening member 18 is such that the upstream aperture 14a of the first channel 14 is hidden behind the flow straightening member 18 as viewed looking downstream along the axis of the first channel 14.

The flow sensor portion 20 includes flow sensor 21 for detecting the flow characteristic (e.g., flow velocity). It will be appreciated that the flow sensor 21 could be of any suitable type for detecting the flow characteristic by any suitable means. In one embodiment, the flow sensor portion 20 includes a temperature compensating resistance element (not shown) and a control circuit (not shown). The flow sensor 21 is heated to a certain temperature relative to the temperature of air by the control circuit. The control circuit outputs as an electrical signal the amount of heat radiated from the flow sensor 21 to the fluid flowing around the flow sensor 21. Based on this electrical signal, a flow amount or a flow velocity is determined by predetermined computer logic.

The downstream member 22 is disposed downstream of and adjacent the downstream aperture 29 of the first channel portion 15. A plurality of arm portions 13 (FIG. 3B) extend from an inner surface 17*a* of the second channel portion 17 and are coupled to the downstream member 22 such that the downstream member 22 is coupled to the second channel portion 17.

The downstream member 22 includes a face 22*a*, which faces upstream, and a face 22*b*, which faces downstream. In the embodiment shown, the face 22*a* is concave in shape, and the face 22*b* is convex in shape. The downstream member 22 is supported downstream of the first channel portion 15 such that a predetermined gap exists between the downstream member 22 and the first channel portion 15. Thus, a downstream-side first channel 23 is formed by the circular conical end face 15*c* and the concave face 22*a*. The downstream-side first channel 23 is inclined relative to the axis of the device 10. As such, the path of flow through downstream-side first channel 23 extends toward the inner surface 17*a* of the second channel portion 17 and toward the upstream aperture 25 of the second channel portion 17. Also, in the embodiment shown, the downstream-side first channel 23 is annularly widened.

As shown in FIG. 2, the width of the downstream member 22 greater than the width of the downstream aperture 29 of the first channel 14 and less than the width of the first channel portion 15. As viewed looking upstream (FIG. 3B), the downstream aperture 29 of the first channel 14 is hidden behind the downstream member 22, and yet a portion of the end face 15*c* of the first channel portion 15 is still visible. Furthermore, the downstream member 22 is disposed such that the downstream face 22*b* extends out of the second channel 16 through the downstream aperture 26.

The support portion 24 is constructed of a cylindrical portion 24*a* and a flange portion 24*b*, and is formed integrally with the second channel portion 17. A cable for connecting the computer for control and the control circuit is disposed in the cylindrical portion 24*a*. As illustrated in FIG. 1A, fastener apertures 24*c* are provided in the flange portion 24*b* for coupling the device to the pipe 11.

Figure 5:
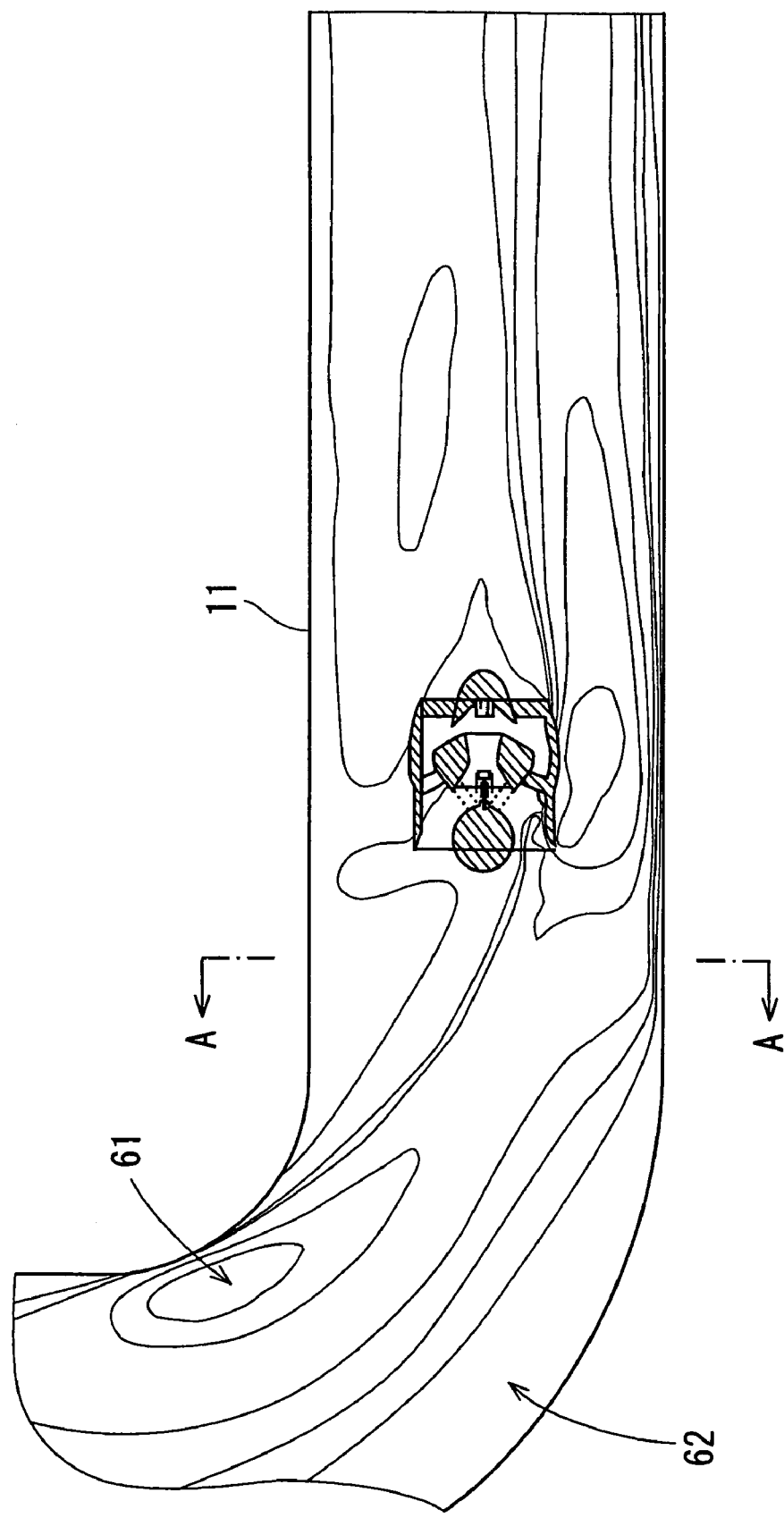
FIG. 5 is a schematic illustration of flow within a flow channel.

Referring now to FIG. 5, the flow of the fluid through the pipe 11 will now be discussed. As shown, asymmetric flow (i.e., drift) can occur in the pipe 11, especially if the pipe 11 includes a bend. When the intake port 11 is bent, a difference in flow velocity is produced at the bent area between the inside 61 and the outside 62, as illustrated in the drawing. As a result, asymmetric flow occurs downstream from the bent area. It will be appreciated that asymmetric flow could occur in a pipe 11 of any type, including a pipe 11 without a bend. For instance, if a filter element connected at an upstream end 11 of the pipe is partially clogged, air will flow more easily through certain areas of the filter and will flow less easily through other areas of the filter. Therefore, asymmetrical flow is likely to occur.

Figure 6:
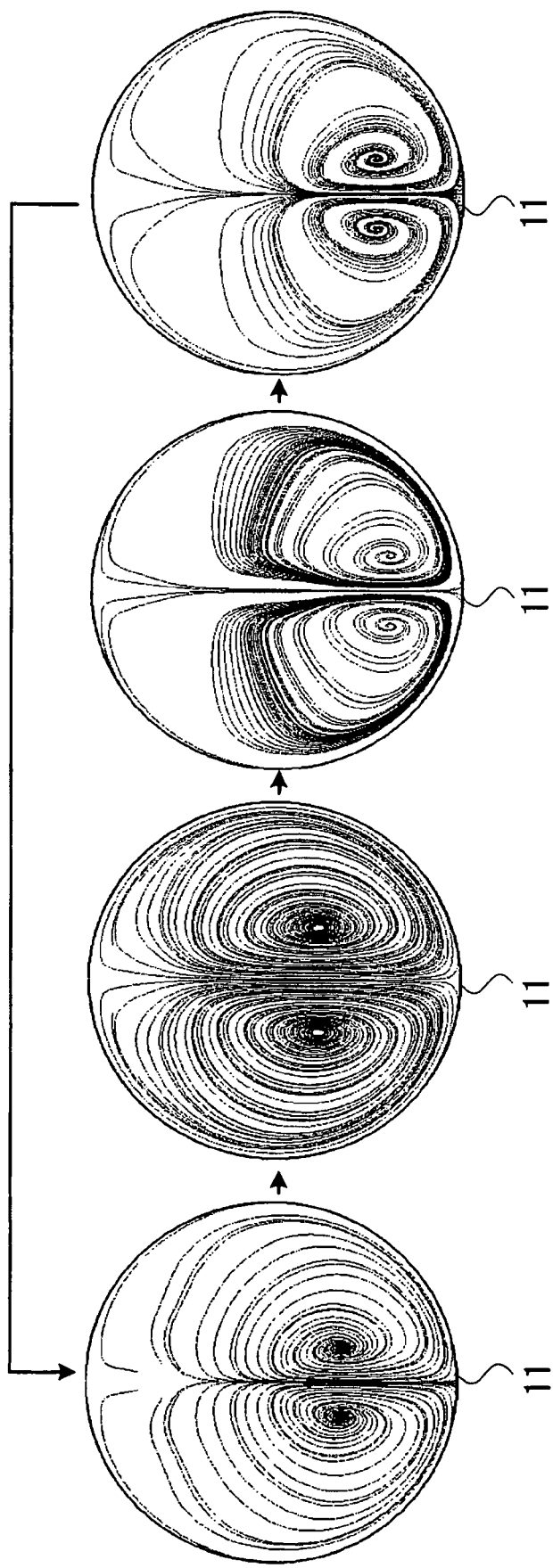
FIG. 6 is a schematic diagram illustrating an example of a pulsating flow that is produced in the main channel.

FIG. 6 is a schematic diagram illustrating the influence of a pulsating flow observed when asymmetric flow and swirl occurs. The distribution of the flow velocity in the pipe indicates that the flow velocity is higher in an area encircled with a line positioned further inside. Specifically, FIG. 6 shows the result of measurement carried out by passing symmetrically flowing fluid through a pipe 11 with a bend. Then, the flow velocity of the fluid was measured in a position downstream from the bent area where drift is occurring (e.g., position A shown in FIG. 5). Then, a pulsating flow was produced in the pipe 11 in correspondence with the combustion cycle of an internal combustion engine. Thus, asymmetrical flow and swirl varies cyclically in correspondence with the pulsating flow, as illustrated in FIG. 6. Accordingly, the flow velocity of the air flowing around the flow sensor 21 for flow velocity measurement is cyclically varied, and it can be difficult to accurately detect flow characteristics, such as flow velocity.

Despite the flow patterns shown in FIGS. 5 and 6, the flow detection device 10 is able to more accurately detect flow characteristics of the fluid. For instance, the flow straightening member 18 causes air to flow from the entire circumference into the upstream aperture 14*a* of the first channel 14.

Figure 7:
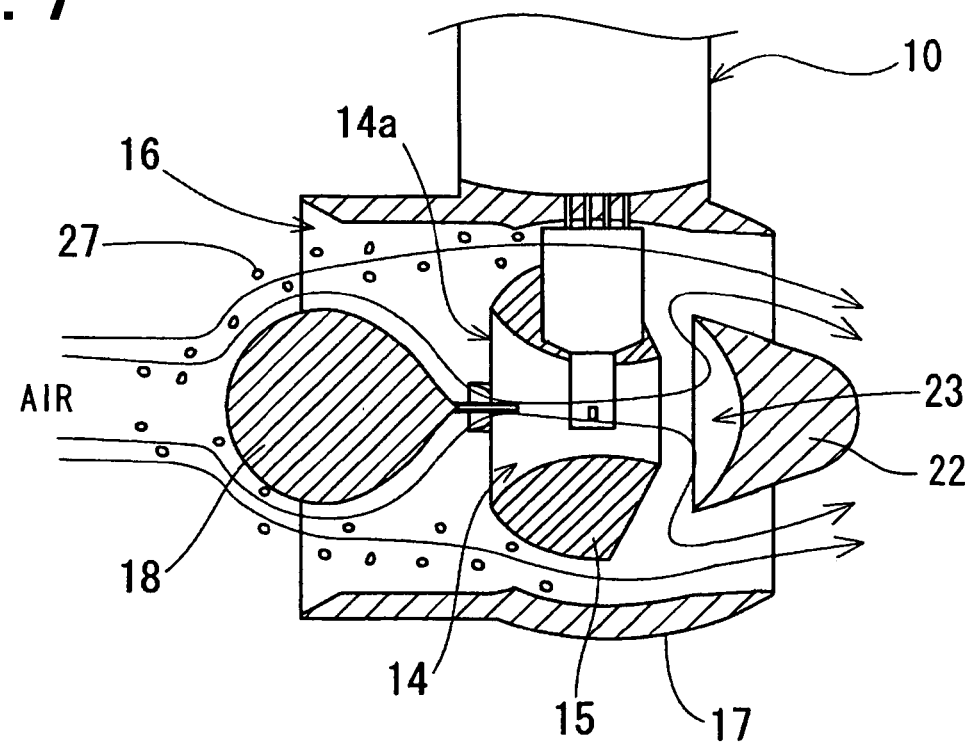
FIG. 7 is a schematic diagram illustrating fluid flow associated with the flow detection device of FIG. 1A.

As shown in FIG. 7, fluid flowing in approximately the center of the pipe 11 eventually interacts with the flow straightening member 18. Specifically, the fluid flows along the upstream side of the flow straightening member 18 and is directed outward radially in 360° as viewed looking downstream. Some of the fluid then flows along the downstream side of the flow straightening member 18, and that fluid converges and is made uniform downstream of the flow straightening member 18. Then, the fluid flows into the first channel 14 through the upstream aperture 14*a*. In this manner, asymmetrical flow of the fluid is substantially reduced. As such, the flow velocity of the air flowing around the flow sensor 21 becomes stable. Further, by reducing asymmetrical flow, the influence of pulsating flow is reduced, and this makes measurement results more accurate.

It will be appreciated that as the fluid flows along the downstream side of the flow straightening member 18, the fluid flows along the entire circumference of the flow straightening member 18. As such, the air flows along a relatively large area along the entire circumference of the flow straightening member 18 for more even flow into the first channel 14. Thus, the flow velocity of the fluid flowing through the first channel 14 is more likely to correspond with the average flow velocity of the fluid flowing through the second channel 16 and the rest of the pipe 11. As a result, more accurate measurement results can be obtained.

Furthermore, the flow straightening member 18 can reduce the amount of foreign particles that contact the flow sensor 21 as shown in FIG. 7. In general, foreign particles may be contained in the fluid. For instance, dust 27 of a small size (e.g., smaller than approximately 100 μm) is likely to pass through a filter element of an air cleaner and flow in the pipe 11. As the dust 27 approaches the flow straightening member 18, the dust 27 is directed outwardly in the radial direction by the flow straightening member 18. As mentioned above, the upstream aperture 14*a* of the first channel 14 is hidden behind the flow straightening member 18. Therefore, a significant amount of the dust 27 is directed away from the first channel 14 and is caused to flow through the second channel 16. Thus, dust 27 is less likely to flow into the first channel 14, and the detection accuracy of the flow sensor 21 is less likely to be impaired by dust 27 sticking to the flow sensor 21.

The downstream member 22 also improves the detection accuracy of the flow sensor 21. First, the downstream member 22 improves accuracy by increasing the flow velocity of the fluid in the first channel 14. Specifically, as illustrated in FIG. 7, the fluid flowing through the first channel 14 flows through the downstream-side first channel 23 formed by the first channel portion 15 and the downstream member 22. Thus, the downstream member 22 obstructs the outlet of the first channel 14. As a result, the flow velocity increases adjacent the downstream aperture 29 of the first channel 14, and negative pressure is produced. The negative pressure draws the fluid out of the first channel 14, and the flow velocity of the fluid in the first channel 14 is increased. Therefore, a ratio of thermal loss is reduced, and the detection accuracy of the flow sensor 21 is enhanced.

Furthermore, flow between the surface 15a of the first channel portion 15 and the inner surface 17a of the second channel portion 17 can be changed by making the second channel portion 17 smaller. When the channel is narrowed, the flow velocity between the surface 15a and the inner surface 17a is increased. As a result, the negative pressure becomes higher, and the flow velocity of the fluid flowing through the first channel 14 is further increased. Thus, the detection accuracy is further enhanced. In other words, the detection accuracy can be enhanced without enlarging the first channel portion 15.

Figure 8:
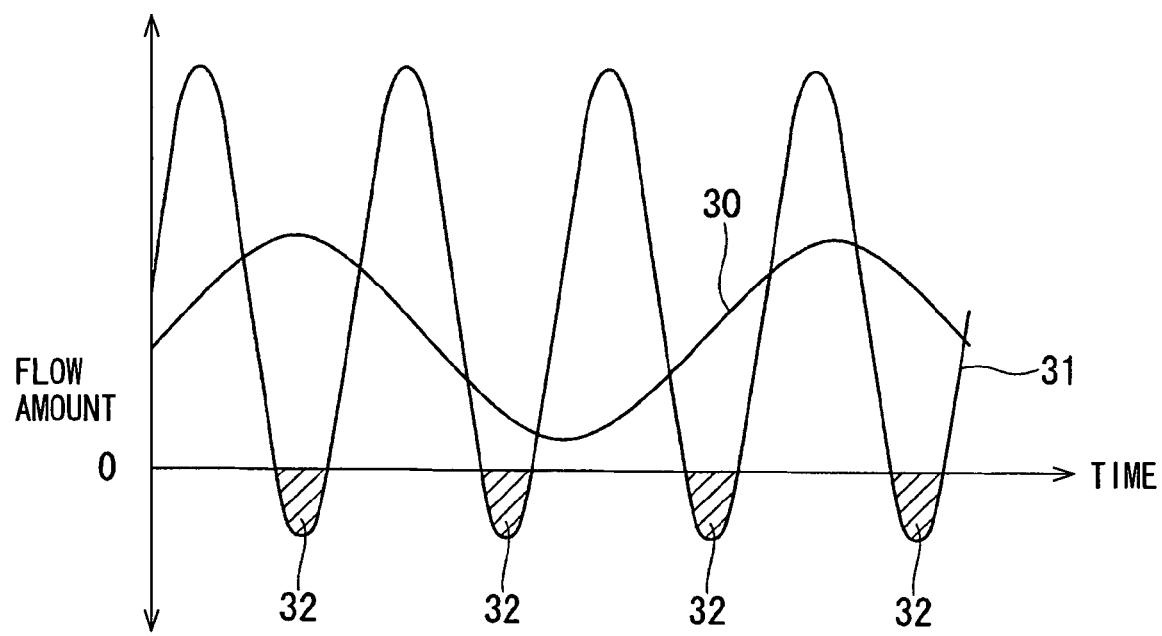
FIG. 8 is a graph showing flow changes through the main channel.

In addition, the downstream member 22 reduces the amount of dust moving upstream from flowing back into the first channel 14. FIG. 8 is a graph showing temporal change in flow amount. In the graph, Line 30 shows temporal change in flow amount observed when the throttle valve is relatively closed, and Line 31 shows temporal change in flow amount observed when the throttle valve is relatively open. Thus, when a pulsating flow is produced in the fluid in the pipe 11 and the opening of the throttle valve becomes equal to a certain value or higher, part of the air flows upstream in the pipe 11. The hatched areas 32 in FIG. 8 represent the periods during which fluid flows upstream.

Figure 9:
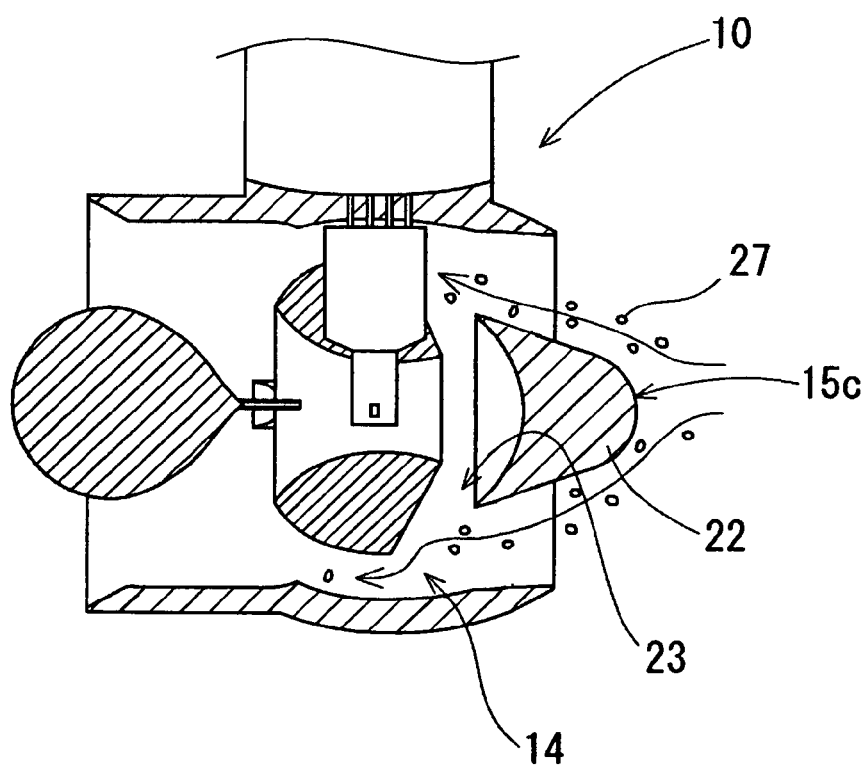
FIG. 9 is a schematic diagram illustrating the backflow of fluid associated with the flow detection device of FIG. 1A.

This type of flow is represented in FIG. 9. As mentioned above, the outlet aperture 29 of the first channel 14 is hidden behind the downstream member 22. Therefore, dust 27 flowing upstream is directed outward in the radial direction by the downstream member 22 and is less likely to flow into the first channel 14. Furthermore, the end face 15c of the first channel portion 15 is shaped conically so as to direct the dust 27 away from the first channel 14. As a result, dust 27 is unlikely to flow upstream and stick to the flow sensor 21, and the accuracy of the flow sensor 21 can be maintained.

Description will now be given to the result of an experiment conducted to compare change in the characteristics of the apparatus 10 for measuring flow amounts with a comparative example. Change in characteristics (S) is expressed by the following expression:

$$S=(FV_A-FV_S)/FV_S$$

$FV_A$ represents flow velocity with asymmetric flow and is obtained by passing air with symmetric flow through a bent pipe and measuring flow velocity downstream from the bent area where asymmetric flow is occurring (e.g., Position A in FIG. 5). $FV_S$ represents flow velocity with symmetric flow and is obtained by passing air with symmetric flow through an straight pipe. The flow velocity with symmetric flow substantially correlates with the average flow velocity of the air flowing through the entire pipe. The same amount of air is passed through the bent pipe and the straight pipe. Therefore, when change in characteristics (S) approaches 0%, the flow detection device 10 is more accurately measuring the average flow velocity of the air flowing through the pipe 11 with a bend. That is, an accurate measurement is taken despite the presence of asymmetrical flow.

Figure 10:
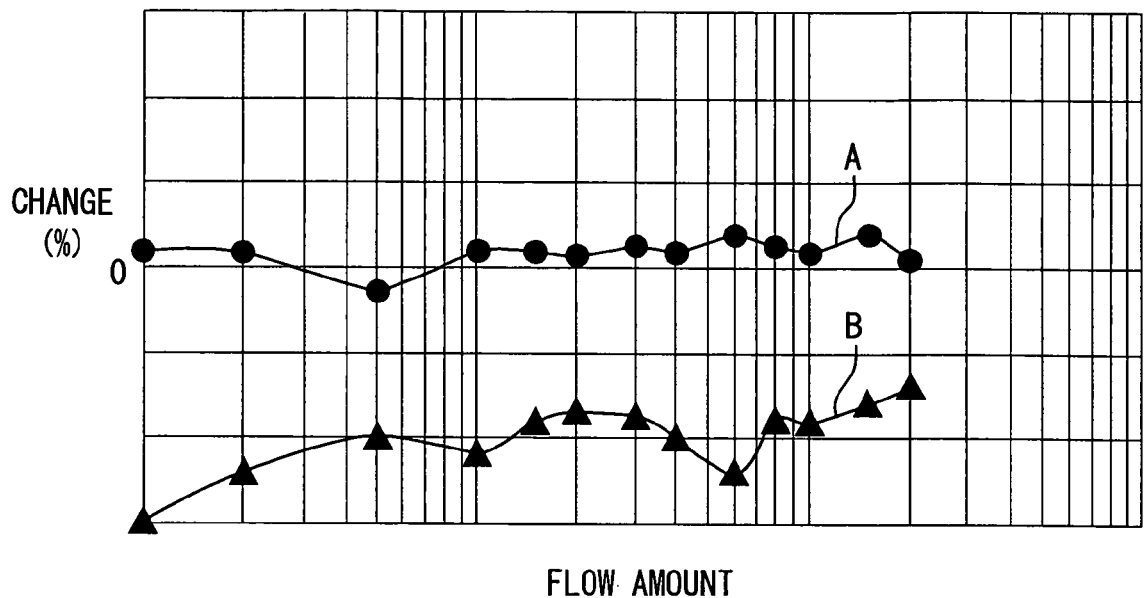
FIG. 10 is a graph illustrating changes in flow characteristics using one embodiment of the flow detection device.

FIG. 10 is a graph showing the result of an experiment conducted to compare change in the characteristics (S) using the device 10 and a comparative example. Here, the device disclosed in U.S. Pat. No. 6,938,473 is used as the comparative example.

In the experiment, the flow amount was gradually increased, and change in characteristics were determined with respect to the flow detection device 10 and the comparative example. As shown in the graph of FIG. 10, the change in the characteristics of the device 10 is close to 0% with each flow amount. Meanwhile, change in the characteristics of the comparative example is biased in the negative direction with any flow amount. Thus, the flow detection device 10 is capable of more accurately measuring the average flow velocity of the fluid flowing through the entire pipe 11 even though there is asymmetrical flow in the pipe 11. In other words, the device 10 allows more accurate measurement results to be obtained.

Second Embodiment

Figure 11:
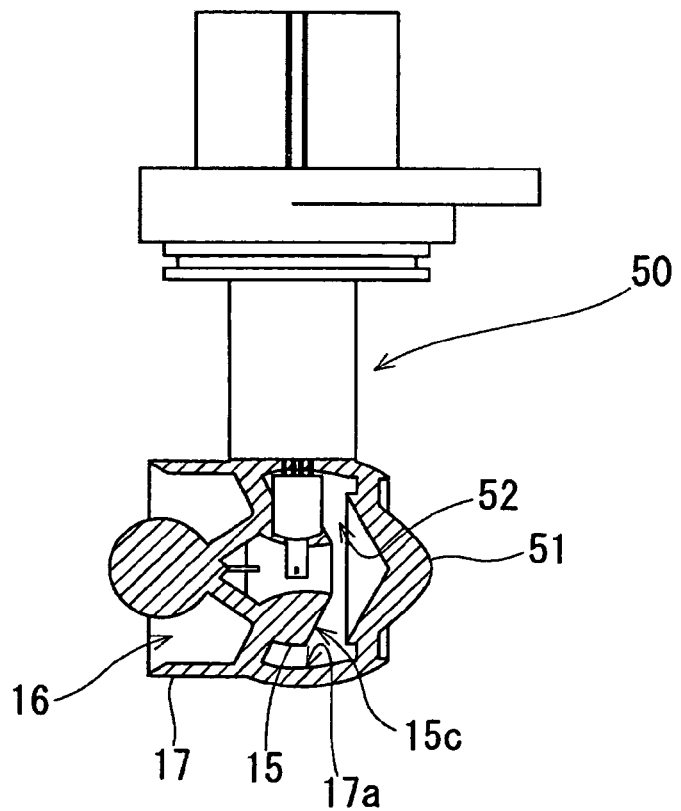
FIG. 11 is a sectional view of another embodiment of the flow detection device, taken along the direction of flow.

Referring now to FIG. 11, another embodiment of the flow detection device 50 for detecting a flow characteristic is shown. The device 50 includes a downstream member 51 that is disposed downstream of a first channel portion 15. A downstream-side first channel 52 is defined between the downstream member 51 and the first channel portion 15. In the embodiment shown, the downstream member 51 is formed in such a size that a downstream-side end face 15a of the first channel portion 15 is hidden behind the downstream member 51 as viewed looking upstream along the axis of the device 50. In other words, the width (perpendicular to the axis of the device 50) of the downstream member 51 is equal to or greater than that of the end face 15a. For this reason, when fluid flows upstream in the pipe 11, dust 27 is less likely to flow along the end face 15a into the downstream-side first channel 52. Thus, measurement results become more stable.

Also, in the embodiment shown, the end face 15a is inclined such that the first channel portion 15 reduces in width moving downstream along the axis of the first channel portion 15. In other words, the end face 15a is inclined so that it is inclined upstream relative to the second channel 16 when moving along the end face 15a toward the inner wall 17a of the second channel portion 17.

In another embodiment, the end face 15a is inclined in an opposite direction, such that the end face 15a is inclined downstream relative to the second channel 16 when moving along the end face 15a toward the inner wall 17a of the second channel portion 17. Also, in this embodiment, the end face 15a is hidden behind the downstream member 51 when viewed looking upstream along the axis of the device 50. Thus, the detection accuracy of the flow sensor 21 is unlikely to be impaired by dust 27 flowing back and sticking to the flow sensor 21.

While only the selected embodiments have been chosen to illustrate the present invention, it will be apparent to those skilled in the art that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A flow detection device for detecting a flow characteristic of a fluid, the flow detection device comprising:
    a first channel portion that defines a first channel with an upstream aperture through which the fluid can flow into the first channel;
    a flow sensor disposed in the first channel, the flow sensor operable for detecting the flow characteristic of the fluid;
    a second channel portion that defines a second channel, wherein the first channel portion is coupled to the second channel portion and is disposed within the second channel;
    a flow straightening member that is coupled to the first channel portion and provided upstream of the first channel; and
    a pipe that includes an insertion aperture for insertion of the first channel portion, the flow sensor, the second channel portion, and the flow straightening member into the pipe,
    wherein the upstream aperture is hidden by the flow straightening member as viewed looking downstream along an axis of the first channel portion,
    wherein the fluid flows from substantially the entire circumference of the flow straightening member into the first channel.

2. The flow detection device according to claim 1, wherein the axis of the first channel is substantially straight such that the axis of the first channel is disposed substantially parallel to an axis of the pipe.

3. The flow detection device according to claim 1, further comprising a downstream member, wherein the first channel further includes a downstream aperture, wherein the fluid flows into the first channel through the upstream aperture and out of the first channel through the downstream aperture, and wherein the downstream member is disposed downstream of the downstream aperture so as to obstruct flow out of the downstream aperture.

4. The flow detection device according to claim 1, wherein the flow straightening member includes an upstream side that is hemispherical in shape and a downstream side that is conic in shape.

5. The flow detection device according to claim 1, wherein the flow straightening member includes an upstream side and a downstream side, wherein the upstream side has a gradually increasing width as observed moving away from the upstream side and toward the downstream side, and wherein the downstream side is hemispherical in shape.

6. The flow detection device according to claim 1, wherein the flow straightening member includes an upstream side and a downstream side, wherein the upstream side has a gradually increasing width as observed moving away from the upstream side and toward the downstream side, and wherein the downstream side has a gradually decreasing width as observed moving away from the upstream side and toward the downstream side.

7. The flow detection device according to claim 1, further comprising a plurality of arm portions that couple the flow straightening member to the first channel portion.

8. A flow detection device for detecting a flow characteristic of a fluid, the flow detection device comprising:
    a first channel portion that defines a first channel through which the fluid can flow, the first channel having an upstream aperture and a downstream aperture such that the fluid can enter the first channel through the upstream aperture and exit the first channel through the downstream aperture;
    a flow sensor disposed in the first channel, the flow sensor operable for detecting the flow characteristic of the fluid;
    a second channel portion that defines a second channel, wherein the first channel portion is coupled to the second channel portion and is disposed within the second channel;
    a downstream member disposed downstream of the downstream aperture so as to obstruct flow out of the downstream aperture; and
    a pipe including an insertion aperture for insertion of the first channel portion, the flow sensor, the second channel portion, and the downstream member into the pipe.

9. The flow detection device according to claim 8, wherein the axis of the first channel is substantially straight such that the axis of the first channel is disposed substantially parallel to an axis of the pipe.

10. The flow detection device according to claim 8, wherein the downstream aperture of the first channel is hidden by the downstream member as viewed looking upstream along an axis of the first channel portion.

11. The flow detection device according to claim 8, wherein the first channel portion includes an end face that is hidden by the downstream member as viewed looking upstream along an axis of the first channel portion.

12. The flow detection device according to claim 11, wherein the end face of the first channel portion is inclined upstream relative to the second channel moving along the end face toward an inner wall of the second channel portion.

13. The flow detecting device according to claim 1, further comprising a support portion for supporting the first channel portion, the flow sensor, the second channel portion, and the flow straightening member, wherein the support portion extends through the insertion aperture and is coupled to the pipe.

14. The flow detecting device according to claim 13, wherein the support portion extends through the insertion aperture approximately perpendicular to an axis of the pipe.

15. The flow detecting device according to claim 8, further comprising a support portion for supporting the first channel portion, the flow sensor, the second channel portion, and the downstream member, wherein the support portion extends through the insertion aperture and is coupled to the pipe.

16. The flow detecting device according to claim 15, wherein the support portion extends through the insertion aperture approximately perpendicular to an axis of the pipe.

* * * * *